US012805588B2

(12) United States Patent
Hanson

(10) Patent No.: US 12,805,588 B2
(45) Date of Patent: Nov. 24, 2026

(54) SWITCHABLE WREATH SYSTEM HAVING MAGNETICALLY INTERCHANGEABLE DECORATIVE ATTACHMENTS, AND A KIT FOR MAKING SAME

(71) Applicant: Laura Hanson, Truesdale, MO (US)

(72) Inventor: Laura Hanson, Truesdale, MO (US)

( * ) Notice: Subject to any disclaimer, the term of this patent is extended or adjusted under 35 U.S.C. 154(b) by 0 days.

(21) Appl. No.: 18/912,522

(22) Filed: Oct. 10, 2024

(65) Prior Publication Data

US 2026/0101948 A1 Apr. 16, 2026

(51) Int. Cl.
*A41G 1/04* (2006.01)
*G09F 7/18* (2006.01)

(52) U.S. Cl.
CPC ................ *A41G 1/04* (2013.01); *G09F 7/18* (2013.01)

(58) Field of Classification Search
CPC ........................ A41G 1/04
USPC ........................ 428/10
See application file for complete search history.

(56) References Cited

U.S. PATENT DOCUMENTS 1,611,589 A 12/1926 Janusek
4,835,024 A * 5/1989 Hallay .................. B60R 13/005 248/537
5,495,686 A 3/1996 Millard et al.
5,508,070 A * 4/1996 DiLapo .................... A41G 1/00 156/61
5,698,275 A * 12/1997 Pompeo ................... A41G 1/00 428/26
9,392,848 B2 7/2016 LeBlanc
10,375,897 B2 8/2019 Tetreault
2003/0096066 A1* 5/2003 Clark ....................... D04D 7/10 428/4
2004/0043361 A1 3/2004 Bialas
2005/0186384 A1 8/2005 Damast
(Continued)

FOREIGN PATENT DOCUMENTS

CA 3015190 A1 2/2020

OTHER PUBLICATIONS

Barbara, "A DIY Interchangeable Magnetic Wreath", video on The Shabby Tree Facebook page, 2021, screenshots assembled from video on p. 1-18; Accessed at https://www.facebook.com/shabbytree/videos/a-diy-interchangeable-magnetic-wreath/310361020885559/.*

(Continued)

*Primary Examiner* — Humera N. Sheikh
*Assistant Examiner* — Julia L Rummel
(74) *Attorney, Agent, or Firm* — Russ Weinzimmer & Associates, PC

(57) ABSTRACT

A switchable wreath system enables customizable decoration, featuring a ferromagnetic wreath base that magnetically receives various interchangeable decorative attachments. The wreath base is made from a durable ferromagnetic material, providing stable magnetic attachment for decorative attachments via integrated magnets. A sign panel is magnetically attachable, allowing for quick replacement of messages or designs. The switchable wreath system includes multiple decorative attachments, such as tulle arrangements, bows, and ribbons, each incorporating magnets for secure and easy removable attachment to the wreath base. The switchable wreath system enables users to modify a wreath's appearance for different occasions, ensuring versatility and reusability, thereby replacing a multiplicity of wreaths, thereby saving money.

18 Claims, 4 Drawing Sheets

(56) References Cited

U.S. PATENT DOCUMENTS

| | | | | |
|---|---|---|---|---|
| 2006/0117629 | A1 | 6/2006 | Errington | |
| 2006/0147653 | A1 | 7/2006 | Karnes | |
| 2007/0029222 | A1 | 2/2007 | Shepardson | |
| 2012/0052218 | A1 * | 3/2012 | Kendall | A01G 5/04 428/10 |
| 2013/0043364 | A1 | 2/2013 | Stoeppler | |
| 2016/0174468 | A1 | 6/2016 | Adams | |
| 2019/0104689 | A1 | 4/2019 | Barnes | |
| 2022/0022380 | A1 | 1/2022 | Mcnamara et al. | |

OTHER PUBLICATIONS

Author: Lucy and Dot Vintage Goods Title: Vintage Avon 10" Magnetic Wreaths—Signs Of Christmas/Country Heart & 12 Shapes Website: https://www.ebay.com/itm/255878625269 Date: Downloaded Page on Feb. 22, 2024. Google Search Result 1.

Author: roedastudio Title: “Welcome” Magnetic Word w/ Greenery. Website: https://roedastudio.com/products/welcome-magnetic-word-w-greenery Date: Downloaded Page on Feb. 22, 2024 Google Search Result 2.

Author: designsonawhim Title: Interchangeable Wreath Website: https://www.pinterest.com/06oasecvp5uepntu0hzanosibostfe/ Date: Downloaded Page on Feb. 22, 2024 Google Search Result 3.

Author: Natalie Cornish Title: Abel & Cole’s £16 wreath-making kit is getting us in the mood for Christmas Website: https://www.prima.co.uk/home-ideas/a29948707/abel-and-cole-wreath-making-kit/ Date: Downloaded Page on Feb. 22, 2024 Google Search Result 4.

Author: still waters wreath designs Title: Christmas Green Monster Wreath Kit | Halloween, Thanksgiving and Christmas DIY Wreath Kits. Website: https://www.youtube.com/watch?v=j6s7bKb45bg Date: Downloaded Page on Feb. 25, 2024.

* cited by examiner

SWITCHABLE WREATH SYSTEM HAVING MAGNETICALLY INTERCHANGEABLE DECORATIVE ATTACHMENTS, AND A KIT FOR MAKING SAME

FIELD OF THE INVENTION

This invention relates generally to decorative wreaths, and more specifically to decorative wreaths having interchangeable decorative components.

BACKGROUND OF THE INVENTION

Wreaths are commonly used as decorative objects for a wide range of occasions, including holidays, celebrations, and memorials. However, traditional wreaths are often made with permanently affixed decorative components, limiting the use of a particular wreath to the specific occasion it was made for. Consequently, a different wreath must be purchased for each specific holiday, celebration, or memorial. As a result, use of these particular traditional wreaths leads to inefficiencies in cost and ease of use, because one must eventually buy a collection of specialized wreaths, one for each of many occasions.

Existing wreaths do not allow for easily modifying or swapping out the decorative components, thereby complicating the process of updating the wreath's appearance to suit each occasion. Also, attempts to change the wreaths appearance for each occasion could result in damaging either the base or the decorative components during attempts to exchange or replace them.

SUMMARY OF THE INVENTION

The switchable wreath system of the invention provides a secure and adaptable apparatus and kit for attaching, detaching, and replacing decorative attachments to a ferromagnetic wreath base.

Such a switchable wreath system enables reusability and personalization, while preserving the integrity of the wreath base and the decorative attachments, thereby replacing a multitude of specialized wreaths.

It features a ferromagnetic wreath base that enables removably securing of decorative attachments, each decorative attachment having a magnet, a fastener, and a decorative element. This allows for the efficient and interchangeable placement of decorative attachments, facilitating quick modifications without the need for permanent fixtures. The customizable nature of the wreath system facilitates changing the wreath system to suit various occasions, reducing the effort required to update the wreath system's appearance, and avoiding the need to purchase new decorative wreaths.

The ferromagnetic wreath base is configured to accommodate multiple decorative attachments, each incorporating a magnet and fastener for secure placement. In some embodiments, the fasteners are reusable, further enhancing the system's adaptability. The base can be made in different shapes, including round or square or rectangular or hexagonal, for example, and can be constructed from durable materials, such as galvanized steel, ensuring longevity and resistance to environmental degradation. The property of switchability allows for quickly and easily adapting the wreath system to express a variety of aesthetic and functional preferences.

The switchable wreath system can also include a magnetically attachable sign panel that is smaller than the ferromagnetic wreath base, featuring a front side for decorative display and a rear side equipped with a plurality of magnets for secure attachment. In some embodiments, this sign panel is centrally affixed to the ferromagnetic wreath base, providing a focal point for organizing a customized selection of decorative attachments surrounding the sign panel.

The decorative attachments can include tulle configured with various layers, secured using an upholstery nail that is positioned through the magnet and the tulle. In some embodiments, at least one decorative attachment can include a ribbon that features a magnet and an attachment device for securing the magnet to the ribbon. Fasteners can include an upholstery nail, or a combination of bolt and nut screw, configured to secure a magnet to the tulle, thereby enabling the tulle to be secured magnetically to the ferromagnetic wreath base.

The kit for creating switchable wreaths can include the ferromagnetic wreath base and a plurality of decorative attachments. In some embodiments, each decorative attachment can include a magnet and a fastener, promoting efficient attachment. The kit can also include an edge protector applied around the circumference of the ferromagnetic wreath base to enhance usability.

A general aspect of the invention is a switchable wreath including: a ferromagnetic wreath base; and a plurality of decorative attachments, each decorative attachment including a magnet, a fastener, a decorative element, and a fastener configured to attach the decorative element to the magnet, the plurality of decorative attachments magnetically attached to the ferromagnetic wreath base.

In some embodiments, the fastener is re-usable.

In some embodiments, the wreath base is round.

In some embodiments, the wreath base is rectangular.

In some embodiments, the ferromagnetic wreath base is galvanized.

In some embodiments, the switchable wreath further includes: a magnetically attachable sign panel smaller than the ferromagnetic wreath base, the magnetically attachable sign panel having a front side for displaying a decorative image, and having a rear side with a plurality of magnets attached thereto.

In some embodiments, the magnetically attachable sign panel is attached centrally to the ferromagnetic wreath base.

In some embodiments, at least one decorative attachment includes: a tulle having a plurality of layers; an upholstery nail having a head and a shank ending in a sharp point; a magnet having a hole therethrough; and a fastener configured to fasten along the shank of the upholstery nail, the upholstery nail pushed first through the hole of the magnet, and then pushed through the tulle, the fastener then fastened to secure the tulle and the magnet to the head of the upholstery nail.

In some embodiments, the fastener includes a ring having a hole, and a set screw that is configured to secure a shank of an upholstery nail that extends through the hole.

In some embodiments, at least one decorative attachment includes: a ribbon, a magnet placed along the ribbon, and an attachment device to secure the magnet to the ribbon.

In some embodiments, the switchable wreath further includes an edge protector applied circumferentially along an edge of the ferromagnetic wreath base.

Another general aspect of the invention is a wreath kit for making switchable wreaths. The wreath kit includes: a ferromagnetic wreath base; and a plurality of decorative attachments, each decorative attachment including a magnet, a fastener, and a decorative element, and a fastener configured to attach the decorative element to the magnet.

In some embodiments, the fastener is re-usable.

In some embodiments, the ferromagnetic wreath base is round.

In some embodiments, the ferromagnetic wreath base is rectangular.

In some embodiments, the ferromagnetic wreath base is galvanized.

In some embodiments, the wreath kit further includes: a magnetically attachable sign panel smaller than the ferromagnetic wreath base, the magnetically attachable sign panel having a front side for displaying a decorative image, and having a rear side with a plurality of magnets attached thereto.

In some embodiments, the magnetically attachable sign panel is attached centrally to the ferromagnetic wreath base.

In some embodiments, at least one decorative attachment includes: a tulle having a plurality of layers; an upholstery nail having a head and a shank ending in a sharp point; a magnet having a hole therethrough; and a fastener configured to fasten along the shank of the upholstery nail, the upholstery nail pushed first through the hole of the magnet, and then pushed through the tulle, the fastener then fastened to secure the tulle and the magnet to the head of the upholstery nail.

In some embodiments, the fastener includes a ring having a hole, and a set screw that is configured to secure a shank of an upholstery nail that extends through the hole.

In some embodiments, at least one decorative attachment includes: a ribbon, a magnet placed along the ribbon, and an attachment device to secure the magnet to the ribbon.

In some embodiments, the wreath kit further includes an edge protector applied circumferentially along an edge of the ferromagnetic wreath base.

BRIEF DESCRIPTION OF DRAWINGS

The invention will be more fully understood from the following detailed description, in conjunction with the following figures, wherein.

DETAILED DESCRIPTION

Figure 1:
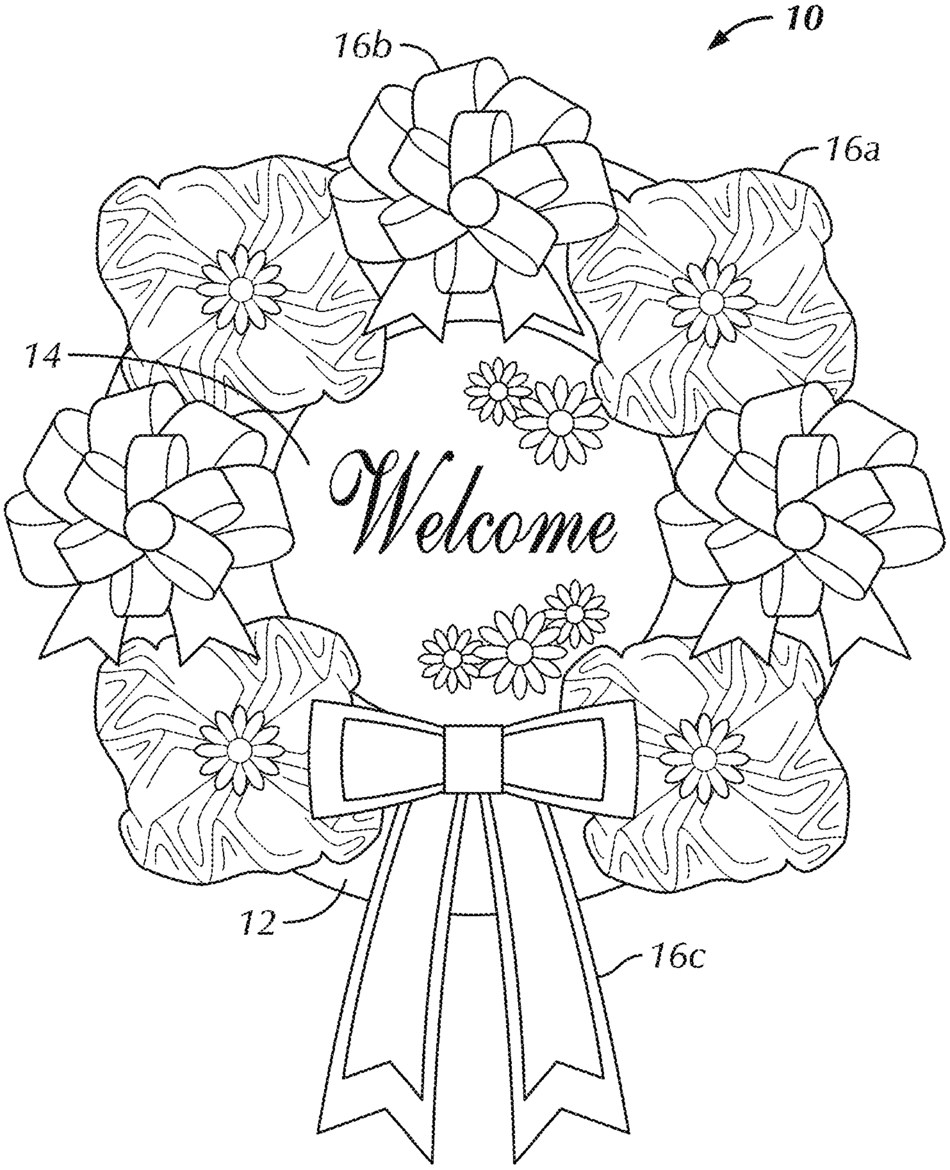
FIG. 1 is a front view of the switchable wreath system having a ferromagnetic wreath base with various decorative attachments, including bows and floral accents attached magnetically around a magnetically attached central sign panel displaying the word "Welcome".

With reference to FIG. 1, a front view is shown of an embodiment 10 of the switchable wreath system. The system includes a ferromagnetic wreath base 12 configured to provide a stable foundation for attaching a plurality of decorative attachments **16*a*, 16*b*, 16*c*. The base 12 can be made from materials such as galvanized steel, powder-coated metal, or stainless steel, for example, offering durability and resistance to adverse environmental conditions. The diameter of the base 12** can range from 14 to 36 inches, for example, depending on the particular application.

Also magnetically attached to the base 12 is a central sign panel 14 displaying the word "Welcome". The central sign panel 14 can be easily removed from the base 12 and replaced by another central sign panel with a different message, such as "Happy Thanksgiving". The dimensions of the central sign panel 14 can vary, balancing aesthetic appeal and functionality, supporting optimal visibility, customization, and readability for different occasions. In some embodiments, the sign panel 14 can have a diameter of around 8 to 14 inches inches, with options for alternative messages to be printed or engraved.

Surrounding sign panel 14 are multiple decorative attachments **16*a*, 16*b*, 16*c*. For example, decorative attachment 16*a*** consists of tulle arranged in multiple layers, such as five, providing a voluminous floral appearance.

Tulle is a lightweight, sheer fabric with a fine netting structure, often made from nylon, silk, or polyester. Its delicate, airy appearance makes it popular for bridal wear, formal attire, and decorative uses such as bows and floral arrangements. Tulle is easily manipulated for layering and creating textured designs, adding volume and elegance to various applications.

In some embodiments, the tulle is secured by placing a magnet in the center, wrapping the tulle around it, and using a zip tie to hold the tulle in place, securing the magnet for attachment to base 12. Alternatively, the center of attachment **16*a*** may be made magnetic using an upholstery nail and fastener to secure a magnet within the tulle.

This wreath system 10 allows for easy interchangeability of decorative attachments, enabling rapid modification of the wreath's design. Decorative bow **16*b*, made from materials like satin or burlap, similarly incorporates a magnet for attachment to base 12**, ensuring easy removal and reattachment.

A third bow **16*c*** differs in design or color, providing further customization. This flexibility allows users to rearrange decorative elements based on personal preferences or seasonal themes, offering a dynamic and adaptable system.

The ferromagnetic wreath base 12 enables secure, yet easily removable attachment of all decorative attachments via magnets, rather than affixing decorative attachments permanently. The switchable wreath system accommodates a variety of decorative attachments, each capable of easy interchangeability.

This embodiment 10 of the switchable wreath system enables users to customize the wreath's appearance for various occasions, from holidays to special events, fostering creativity in design, while streamlining the decoration process. Users can swap bows, flowers, and the central sign panel as needed, enhancing both the functionality and aesthetic appeal of the wreath 10.

Figure 2:
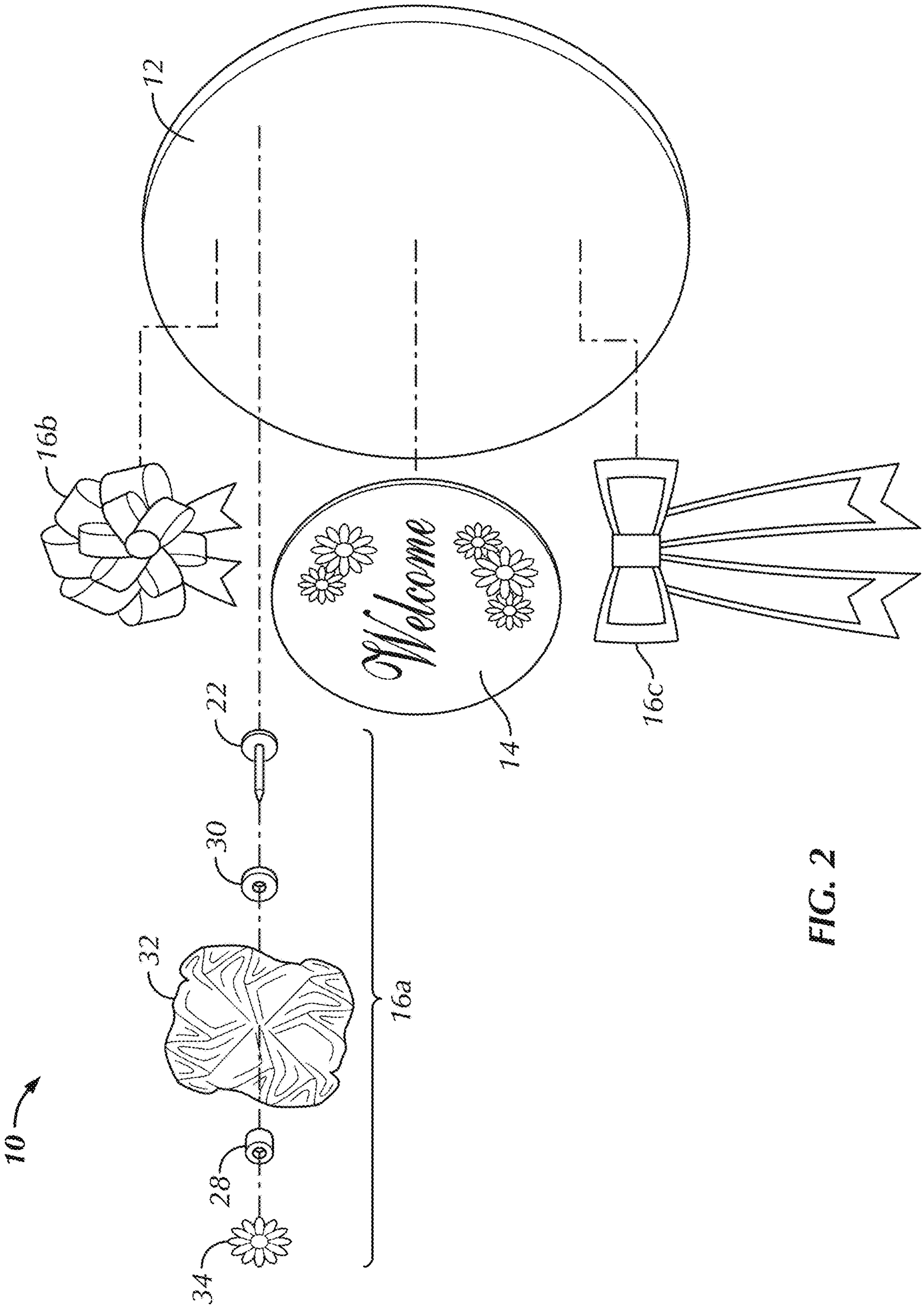
FIG. 2 is an exploded orthographic view of the switchable wreath system of FIG. 1, including an exploded view of a floral accent made using tulle for magnetic attachment to the ferromagnetic wreath base, also showing a magnetically attachable ribbon, the magnetically attachable sign panel, and a magnetically attachable bow.

With reference to FIG. 2, an exploded view of the switchable wreath system is shown, emphasizing the configuration and interaction of its components. The system includes a ferromagnetic wreath base 12, which serves as the foundation for removably attaching various decorative attachments 16*a*, 16*b*, 16*c*, also serving as the foundation for removably attaching the magnetically attachable sign panel 14. The magnetically attachable sign panel 14 can be attached anywhere on the base 12, but in this embodiment 10 it is placed concentrically on the base 12. Both the panel 14 and the base 12 are round, but the panel 14 is smaller than the wreath base 12, having a diameter suitable for providing legibility, while also allowing space for attachment of decorative attachments 16*a*, 16*b*, 16*c*. The sign panel 14 offers a balance between aesthetic proportionality and functionality, allowing for flexibility in adding other decorative attachments.

In this embodiment 10, the decorative attachment 16*a* is made using tulle, arranged in multiple layers 32, typically three to five layers. Each layer can vary in width between 4 to 12 inches, providing a voluminous appearance. A magnet 30 is placed under the center of the tulle layers 32, and an upholstery nail 22 is inserted through the magnet 30 and the tulle layers 32. Then, a set screw shaft collar 28 is placed along the shaft 26 of the upholstery nail 22 extending through the layers 32 until it presses against the tule layers 32. The set screw shaft collar 28 is then secured along the shaft 26 of upholstery nail 22 using the set screw of the set screw shaft collar 28. An optional decorative cap 34 can then be applied to the set screw collar 28 using removable adhesive or an embedded magnet to conceal the set screw shaft collar 28, enhancing the overall aesthetic impression.

Another decorative attachment is the bow 16*b*, made using materials like satin or burlap. A solid magnet, without a hole, can be integrated into the center of the bow 16*b* to enable attachment to the base 12. The magnet (not shown) can be glued or sewn into the bow 16*b* to enable secure yet removable fastening and repositioning. The size of the bow 16*b* can vary, typically ranging from 6 to 12 inches.

Additionally, a decorative bow 16*c* can be included that differs in style and color from the bow 16*b*, providing further customization options. These decorative attachments 16*a*, 16*b*, 16*c* are illustrative examples, and various other magnetically attachable decorative elements can be included in the system, providing further options and adaptability.

The ferromagnetic base 12 provides a secure magnetic attachment for all the decorative elements 16*a*, 16*b*, 16*c*, and for the sign panel 14, thereby allowing for quick and easy modifications without the need to remove permanent decorative attachments. This makes the switchable wreath system highly adaptable to seasonal changes, or for use as special event decorations.

Figure 3:
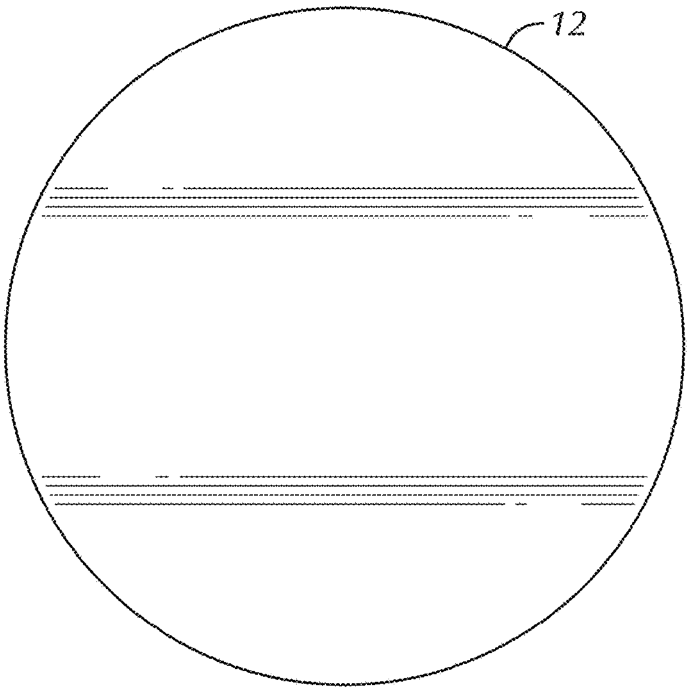
FIG. 3 is a front view of the ferromagnetic wreath base of FIGS. 1 and 2.

With reference to FIG. 3, a front view of the ferromagnetic wreath base 12 is shown. The base 12 is constructed from durable ferromagnetic materials, such as galvanized steel or iron, which provide strong magnetic adhesion for attaching various decorative attachments, such as attachments 16*a*, 16*b*, 16*c*, and the sign panel 14. Useful dimensions of the wreath base 12 range from 14 inches to 36 inches. This dimension range ensures sufficient surface area for securely holding multiple decorative attachments, while maintaining a balanced and aesthetically pleasing appearance.

The base 12 can have a thickness typically between 0.03 to 0.3 inches, offering adequate strength and durability to support the weight of the decorative attachments. This thickness allows for reliable magnetic attachment, while providing a base 12 that is lightweight and easy to handle. The ferromagnetic properties of the base 12 enable quick and secure attachment and removal of all magnetically attachable decorative elements, such as sign panels, tulle, and bows.

The base 12 also features a smooth, continuous surface that enhances the overall aesthetic appeal of the assembled wreath. Its versatility allows for alternative shapes, including: circular, rectangular, or custom designs, while maintaining the same ferromagnetic characteristics necessary for secure attachment and removal. This adaptability makes the wreath base 12 suitable for a variety of seasonal events, holidays, or special gatherings, providing users with an efficient and customizable decoration system.

Figure 4:
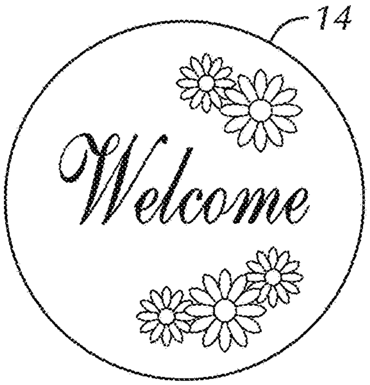
FIG. 4 is afront view of the central sign panel of FIGS. 1 and 2, displaying the word "Welcome".

With reference to FIG. 4, a front view of the magnetically attachable sign panel 14 is shown. The sign panel 14 serves as a customizable decorative attachment option of the switchable wreath system, configured to prominently display a message, such as "Welcome," with surrounding decorative floral attachments, such as 16*a*, 16*b*, 16*c*, to enhance visual interest.

The dimensions of the sign panel 14 can range from 8 to 14 inches in diameter, for example. In some embodiments, it is approximately 12 inches in diameter, providing a beneficial balance between visibility and aesthetic proportionality when attached to the wreath base 12. The diameter of 12 inches ensures clear readability of the message, while leaving sufficient space for additional decorative attachments. Alternative embodiments can feature sign panels of varying sizes to meet different design preferences or display requirements.

Figure 10:
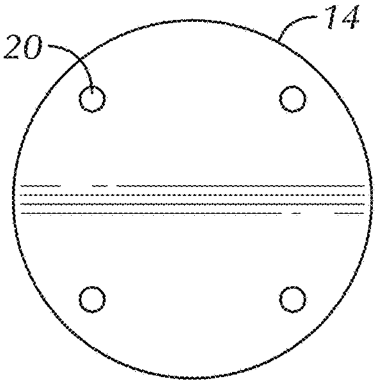
FIG. 10 is a rear view of the magnetically attachable sign panel, showing a plurality of magnets for attaching the sign panel to the ferromagnetic wreath base.

The rear side of the sign panel 14 is equipped with magnets 20 as shown in FIG. 10 to ensure secure yet removable attachment to the ferromagnetic wreath base 12. In some embodiments, several magnets 20, such as Neodymium, Samarium Cobalt, ceramic, flexible, or injection molded, can be affixed to the back of the sign panel 14 to provide stable yet removable magnetic adhesion. Use of magnets facilitates easy removal and replacement of the sign panel 14, allowing users to switch messages or designs without compromising structural stability.

The materials used to make the sign panel 14 can include durable substrates such as wood, plastic, or metal, with a thickness ranging from 0.1 to 0.3 inches, providing structural integrity while maintaining lightweight functionality. The surface can be finished with coatings, such as paint or vinyl, ensuring resistance to environmental degradation.

Figure 5:
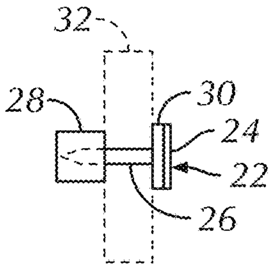
FIG. 5 is a side view of the floral accent in the exploded view FIG. 2, showing the parts of the floral accent assembled and ready for magnetic attachment to the ferromagnetic wreath base.

With reference to FIG. 5, a side view shows the result of assembling the decorative attachment 16*a* shown in the exploded view of FIG. 2. The attachment 16*a* includes an upholstery nail 22 with a head 24 and shaft 26, a set screw shaft collar 28, a magnet 30, and multi-layered tulle 32. These components together enable magnetic attachment of the tulle 32 to the ferromagnetic wreath base 12. In some embodiments, the tulle 32 is made magnetically attachable by positioning a magnet 30 at its center by wrapping the tulle around the magnet 30, and securing the magnet 30 with a zip tie (not shown) to keep the magnet 30 affixed.

The tulle 32 typically consists of three to five layers, each layer measuring between 4 to 12 inches in width. This multi-layered configuration provides volume and texture, while maintaining the lightweight properties of the material. The chosen layer width and number of layers ensure that the tulle maintains its structural integrity and visual fullness without excessive weight, enhancing its suitability for decoration. This balance between volume and weight is crucial for maintaining the tulle's form and aesthetic appeal when attached to the wreath base 12.

The upholstery nail 22 includes a head 24 with a diameter ranging from approximately 0.5 to 1 inch and a shaft 26 extending between approximately 0.5 to 1.2 inches, so as to entirely penetrate through a decorative element. In some embodiments, the nail can be replaced with a small bolt, offering a more robust attachment. The magnet 30 can have an outer diameter of about 1 inch, and an inner diameter of approximately 0.25 inches, providing strong magnetic adhesion, although other dimensions can be used depending on the application. The fastener 28 can consist of a screwed-on nut that fits over the bolt's threads, securing the entire assembly. Alternative fastening mechanisms can also be used to accommodate various requirements and application specifications.

The assembly process involves inserting the shaft 26 of the nail 22 through the magnet 30 and tulle 32, securing it with the set screw shaft collar 28 along the shaft 26 to ensure that the nail 22 does not pull out from the magnet 30 and the tule 32. This configuration allows for easy interchangeability of decorative attachments, enabling quick modifications based on user preferences or seasonal themes.

Figure 6:
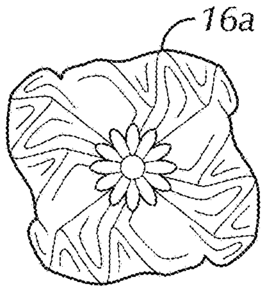
FIG. 6 is front view of a floral accent for attachment to the ferromagnetic wreath base.

With reference to FIG. 6, a front view of a decorative tulle element **16*a* is shown, intended for attachment to the ferromagnetic wreath base 12. The tulle 16*a* is arranged in a multi-layered configuration, typically consisting of three to five layers, enhancing its visual appeal when affixed to the wreath. The layers can measure approximately 4 to 12 inches wide, offering a voluminous appearance. In some embodiments, the tulle 16*a* can incorporate various colors, patterns, or textures to suit different occasions, providing versatility in decorative themes. The tulle 16*a* configured as described in FIG. 5 is secured to the wreath base 12, ensuring a stable magnetic connection while allowing for easy removal and replacement. Alternative embodiments can feature tulle 16*a*** integrated with lighting elements or decorative accents, such as beads or sequins, further enhancing the visual impact.

Figure 7:
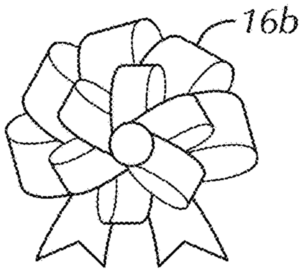
FIG. 7 is a front view of a ribbon accent for attachment to the ferromagnetic wreath base.

With reference to FIG. 7, afront view of a decorative bow element **16*b* is illustrated. The bow 16*b* serves as a visual focal point, contributing significantly to the overall decorative theme of the wreath. In some embodiments, the bow 16*b* can be made from various materials, such as fabric, ribbon, or synthetic fibers, allowing for customization in both texture and appearance. The bow can range in width from approximately 6 to 12 inches, offering flexibility in size. To facilitate attachment of the decorative bow element 16*b***, a magnet with a hole can be incorporated, secured with adhesive and a screw for additional mechanical stability. Incorporation of the magnet ensures that the bow will remain securely affixed to the wreath base while allowing for easy repositioning or replacement with other decorative elements. Alternative embodiments can include adjustable-sized bows, or embellishments such as floral accents, further enhancing customization options.

Figure 8:
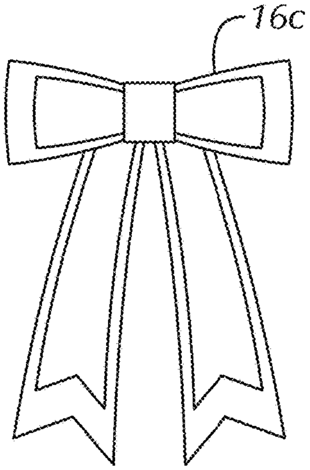
FIG. 8 is a front view of another embodiment of a ribbon accent for attachment to the ferromagnetic wreath base.

With reference to FIG. 8, a front view of a decorative ribbon attachment **16*c* is shown. This embodiment of the ribbon attachment 16*c* has a dual-tail design, offering added visual interest and depth. It can be constructed from materials such as satin, burlap, or grosgrain, providing a balance between aesthetic appeal and durability. A magnet incorporated within the ribbon attachment 16*c* enables the ribbon attachment 16*c* to be securely placed on the wreath base 12, while still enabling quick changes to the arrangement. In some embodiments, the ribbon attachment 16*c*** can be decorated with patterns, prints, or textures tailored to specific holidays or events, further enhancing the wreath's seasonal versatility. Alternative embodiments can include adjustable lengths or layered ribbon configurations, allowing users to personalize the appearance based on individual preferences or themes.

Figure 9:
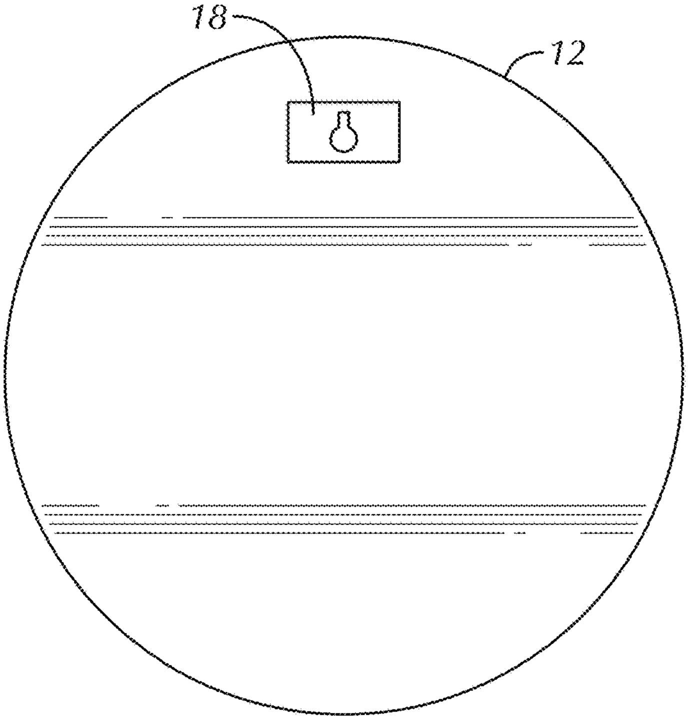
FIG. 9 is a rear view of the ferromagnetic wreath base of FIG. 3, showing a mounting feature for mounting the switchable wreath system on a nail.

With reference to FIG. 9, a rear view of the ferromagnetic wreath base 12 is shown, showing a mounting feature 18 for mounting the switchable wreath system on a nail or a screw. The mounting feature 18 can be a keyhole-style slot as shown in FIG. 9, the slot configured to receive a nail head or a screw head that has been driven into a supporting surface, such as a wall or a door. Alternatively, a sawtooth picture hanger (not shown) can be used as the mounting feature 18.

The mounting feature 18 is positioned in the upper portion of the wreath base 12 to ensure balanced hanging and prevent tilting when attached to a surface. The material surrounding the slot is reinforced to ensure durability, and to withstand the weight of the fully assembled wreath system 10 with its various decorative attachments.

The mounting feature 18 allows the wreath system 10 to be easily mounted or removed from a surface, providing a flexible and user-friendly mounting solution. The size and shape of the keyhole slot can be modified in alternative embodiments to accommodate different hanging systems, such as larger hooks or specialized brackets.

With reference to FIG. 10, a rear view of the magnetically attachable sign panel 14 is provided, showing the placement of multiple magnets 20 that allow the sign panel 14 to be securely attached to the ferromagnetic wreath base 12, while allowing for easy removal and replacement.

The magnets 20 can be circular in shape, for example, with a diameter ranging from approximately 0.5 to 1 inch, depending on the size and weight of the sign panel 14 and the necessary magnetic force required for secure attachment. The thickness of each magnet can range between 0.01 to 0.2 inches, ensuring sufficient magnetic strength.

The magnets 20 are distributed evenly about the perimeter of the sign panel 14, with at least two magnets 20 positioned to prevent rotational movement, and to balance the attachment to the wreath base 12. This placement provides optimal distribution of magnetic force, ensuring that the sign panel 14 remains aligned and securely affixed during use. The positioning also allows for ease of assembly, ensuring that the sign panel 14 can be quickly attached or removed without additional tools.

In some embodiments, the magnets 20 can be embedded in the rear surface of the sign panel 14 using adhesive, screws, or snap-fit mechanisms. This ensures a strong and durable connection between the magnets and the sign panel, while also allowing the magnets 20 to be flush with the surface or slightly recessed.

This arrangement of the magnets 20 provides flexibility for users to switch out the sign panel 14 as needed, making it possible to replace the "Welcome" sign with other messages or designs, enhancing the versatility of the switchable wreath system 10.

Figure 11:
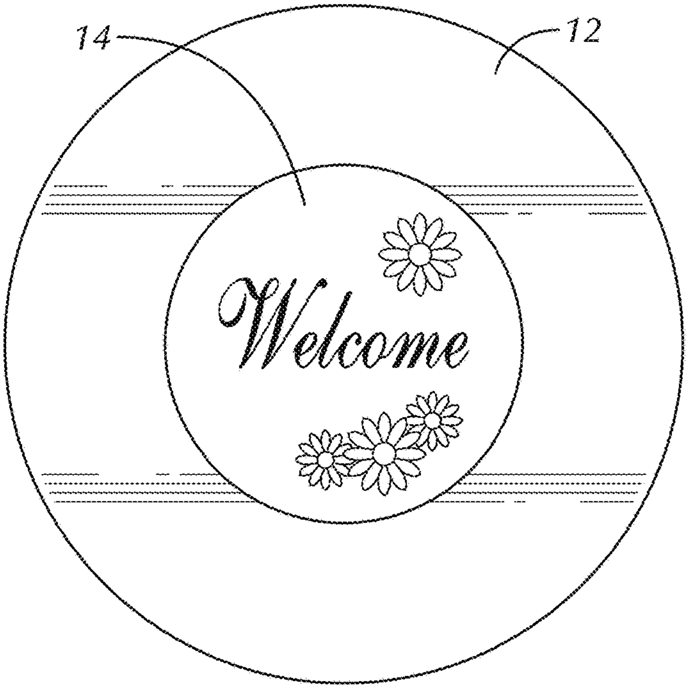
FIG. 11 is a front view of the switchable wreath system of FIGS. 1 and 2, showing the sign panel centrally attached to the ferromagnetic wreath base.

With reference to FIG. 11, a front view of the switchable wreath system 10 is shown without decorative attachments, showing only a central magnetically attachable sign panel 14 secured to the ferromagnetic wreath base 12. The wreath base 12 is made from a ferromagnetic material such as steel or a galvanized iron alloy, which allows for magnetic attachments, including the sign panel 14 and various other decorative attachments. In this embodiment, the sign panel 14 is centrally placed on the wreath base 12, as depicted by the concentric arrangement, demonstrating the attachment mechanism facilitated by a plurality of embedded magnets 20 on the rear surface of the sign panel 14.

In this embodiment, the sign panel 14 features a "Welcome" message alongside decorative floral motifs, which are representative but non-limiting examples of the types of messages and designs that can be displayed. The sign panel 14 can have a diameter ranging between 8 and 14 inches, making it proportionally smaller than the wreath base 12, which can have a diameter of approximately 14 to 36 inches or more. The dimensions of the panel 14 and base 12 are provided as examples, but other sizes can be used depending on the overall application and aesthetic preferences.

The rear side of the sign panel 14 has at least two magnets 20, allowing the panel to be securely affixed to the ferromagnetic surface of the wreath base 12 without the need for adhesives or mechanical fasteners. Magnetic attachment of the sign panel 14 ensures stability, while permitting easy removal or replacement of the sign panel 14. In alternative embodiments, different messages or visual elements can be substituted on the sign panel 14, enabling users to customize the wreath system 10 for various events or occasions such as holidays, celebrations, or other themed displays.

The ferromagnetic nature of the wreath base 12 further facilitates the attachment of additional decorative elements, such as tulle, bows, and ribbons, enabling a fully customizable decorative system. The wreath base 12 itself is configured to support various loads without deformation, ensuring that the wreath system 10 retains its structural integrity, even when multiple decorative attachments are magnetically affixed simultaneously.

This arrangement of the sign panel 14 and wreath base 12 emphasizes the versatility of the wreath system 10 in decorative applications, offering both aesthetic customization and practical ease of use. The use of magnets in both the sign panel 14 and the decorative attachments such as 16*a*, 16*b*, 16*c*, thereby ensuring that users can swiftly switch the appearance of the wreath to suit different occasions, without causing damage to either the wreath base 12 or to the decorative attachments.

In some embodiments, the system further includes an edge protector (not shown) that fits along the outer circumference of the wreath base 12. This edge protector, which can be made from materials such as rubber, silicone, or plastic, provides protection against wear and tear, shielding both the base and the surfaces it contacts from potential damage, and protecting a user of the wreath system 10 from sharp edges of the wreath base 12.

The edge protector is configured to be installed by snapping, sliding, or friction-fitting it around the base, and can optionally be secured with an adhesive or clips. In some embodiments, the edge protector can also feature decorative patterns or colors to enhance the visual appeal of the wreath system 10. This provides both functional protection and an additional opportunity for customization, ensuring that the wreath system 10 is durable and adaptable to various aesthetic preferences. The inclusion of the edge protector improves the longevity and usability of the wreath system 10 while safeguarding users from the potentially sharp metal edges of the base 12.

It is advantageous that all of the parts of the switchable wreath system 10 are provided and sold as a kit. The kit includes a ferromagnetic wreath base 12, a variety of decorative attachments such as 16*a*, 16*b*, 16*c*, and a variety of sign panels 14 to enable adaptability and creativity to suit the occasion. Additionally, the wreath kit can include a variety of edge protectors with different appearances that can be applied circumferentially along the outer edge of the ferromagnetic wreath base 12.

Other modifications and implementations will occur to those skilled in the art without departing from the spirit and the scope of the invention as claimed. Accordingly, the above description is not intended to limit the invention, except as indicated in the following claims.

What is claimed is:

1. A switchable wreath comprising:

a ferromagnetic wreath base; and a plurality of decorative attachments, each decorative attachment including a magnet, a fastener, and a decorative element, wherein the fastener is configured to attach the decorative element to the magnet;

wherein at least one of the decorative attachments includes:

a tulle structure having a plurality of layers;

an upholstery nail consisting of a head and a shank that extends from the head, has a uniform width along its length, and ends in a sharp point;

a magnet having a hole therethrough; and a fastener that is configured to fasten along the shank of the upholstery nail;

wherein, in assembling the decorative element to the magnet, the upholstery nail is pushed first through the hole of the magnet and then pushed through the layers of the tulle structure, and the fastener then fastened to secure the tulle and the magnet to the head of the upholstery nail; and wherein the plurality of decorative attachments magnetically attached to the ferromagnetic wreath base.

2. The switchable wreath of claim 1, wherein the fastener of at least one decorative attachment is reusable.

3. The switchable wreath of claim 1, wherein the wreath base is round.

4. The switchable wreath of claim 1, wherein the wreath base is rectangular.

5. The switchable wreath of claim 1, wherein the ferromagnetic wreath base is galvanized.

6. The switchable wreath of claim 1, further comprising:

a magnetically attachable sign panel smaller than the ferromagnetic wreath base, the magnetically attachable sign panel having a front side for displaying a decorative image, and having a rear side with a plurality of magnets attached thereto.

7. The switchable wreath of claim 6, wherein the magnetically attachable sign panel is attached centrally to the ferromagnetic wreath base.

8. The switchable wreath of claim 1, wherein the fastener of at least one decorative attachment includes a ring having a hole, and a set screw that is configured to secure a shank of an upholstery nail that extends through the hole.

9. The switchable wreath of claim 1, wherein at least one of the decorative attachments includes:

a ribbon, a magnet placed along the ribbon, and an attachment device to secure the magnet to the ribbon.

10. The switchable wreath of claim 1, further comprising an edge protector applied circumferentially along an edge of the ferromagnetic wreath base.

11. A wreath kit for making switchable wreaths, the wreath kit comprising:

a ferromagnetic wreath base; and a plurality of decorative attachments, each decorative attachment including a magnet, a fastener, and a decorative element, wherein the fastener is configured to attach the decorative element to the magnet;

wherein at least one of the decorative attachments includes:

a tulle structure having a plurality of layers;

an upholstery nail consisting of a head and a shank that extends from the head, has a uniform width along its length, and ends in a sharp point;

a magnet having a hole therethrough; and a fastener that is configured to fasten along the shank of the upholstery nail;

wherein, in assembling the decorative element to the magnet, the upholstery nail is pushed first through the hole of the magnet and then pushed through the layers of the tulle structure, and the fastener then fastened to secure the tulle and the magnet to the head of the upholstery nail.

12. The wreath kit of claim 11, wherein the fastener is re-usable.

13. The wreath kit of claim 11, wherein the ferromagnetic wreath base is round.

14. The wreath kit of claim 11, further comprising:

a magnetically attachable sign panel smaller than the ferromagnetic wreath base, the magnetically attachable sign panel having a front side for displaying a decorative image, and having a rear side with a plurality of magnets attached thereto.

15. The wreath kit of claim 14, wherein the magnetically attachable sign panel is attached centrally to the ferromagnetic wreath base.

16. The wreath kit of claim 11, wherein the fastener of at least one decorative attachment includes a ring having a hole, and a set screw that is configured to secure a shank of an upholstery nail that extends through the hole.

17. The wreath kit of claim 11, wherein at least one of the decorative attachments includes:

a ribbon, a magnet placed along the ribbon, and an attachment device to secure the magnet to the ribbon.

18. The wreath kit of claim 11, further comprising an edge protector applied circumferentially along an edge of the ferromagnetic wreath base.

* * * * *